US 6,685,412 B2

(12) United States Patent
Altarac et al.

(10) Patent No.: US 6,685,412 B2
(45) Date of Patent: Feb. 3, 2004

(54) MULTI-LOBE TORQUE DRIVING RECESS AND TOOL IN PARTICULAR FOR AN ORTHOPEDIC IMPLANT SCREW

(75) Inventors: Moti Altarac, Aliso Viejo, CA (US); Leonard James Schaust, Delano, MN (US)

(73) Assignee: Cross Medical Products, Inc., Irvine, CA (US)

( * ) Notice: Subject to any disclaimer, the term of this patent is extended or adjusted under 35 U.S.C. 154(b) by 49 days.

(21) Appl. No.: 10/046,514

(22) Filed: Oct. 19, 2001

(65) Prior Publication Data
US 2003/0077145 A1 Apr. 24, 2003

(51) Int. Cl.[7] .................................................. F16B 23/00
(52) U.S. Cl. ......................... 411/403; 411/410; 81/460
(58) Field of Search ................................ 411/402, 403, 411/407, 410, 389, 437, 178, 404, 919; 81/460

(56) References Cited

U.S. PATENT DOCUMENTS

| | | | |
|---|---|---|---|
| 1,075,710 A | * | 10/1913 | Goodwin |
| 2,083,092 A | | 6/1937 | Richer |
| 3,190,169 A | * | 6/1965 | Rosan |
| 3,841,371 A | * | 10/1974 | Thurston |
| 4,010,670 A | * | 3/1977 | Lejdegard |
| 4,170,918 A | * | 10/1979 | Burge |
| 4,760,843 A | * | 8/1988 | Fischer |
| 5,137,407 A | | 8/1992 | Yamamoto |
| 5,139,380 A | * | 8/1992 | Reynolds |
| 5,171,117 A | | 12/1992 | Seidl |
| 5,279,190 A | | 1/1994 | Goss et al. |
| 5,435,680 A | | 7/1995 | Schuster |
| 5,461,952 A | | 10/1995 | Goss |
| 5,509,334 A | | 4/1996 | Shinjo |
| 5,553,983 A | | 9/1996 | Shinjo |
| 5,674,036 A | * | 10/1997 | Hsieh |

FOREIGN PATENT DOCUMENTS

| | | | |
|---|---|---|---|
| DE | 802433 | * | 2/1951 |
| GB | 357468 | * | 9/1931 |

* cited by examiner

Primary Examiner—Flemming Saether
(74) Attorney, Agent, or Firm—Hudak, Shunk & Farine Co. LPA; Laura F. Shunk

(57) ABSTRACT

The present invention provides a fastener, such as a screw or nut and tool designed in particular for use with an orthopedic implant system wherein the fastener has a multi-lobed torque driving recess. The recess has a central area bounded by equally spaced hemicircular grooves separated by internally projecting land having two sharp edges. The tool has a corresponding male shape, which in conjugation with the recess, is designed to achieve a controlled torque load with a minimized possibility of stripping the recess or of shearing the torque-driving tip from the tool.

13 Claims, 2 Drawing Sheets

MULTI-LOBE TORQUE DRIVING RECESS AND TOOL IN PARTICULAR FOR AN ORTHOPEDIC IMPLANT SCREW

The present invention relates to a novel screw and tool in particular for use with a orthopedic implant system wherein the screw has a torque driving recess with a particular configuration designed for its intended use. The tool has a corresponding male shape, which in conjugation with the screw recess, is designed to achieve a controlled torque load with a minimized possibility of stripping the recess or of shearing the torque-driving tip from the tool. The configuration of the recess is constant along its length and in cross section appears as a central circle with multiple intersecting circles on its circumference.

BACKGROUND OF THE INVENTION

Orthopedic implant systems, such as those used in the spine, are finely engineered constructs which are designed to react to certain loads applied by the muscular-skeletal system of the patient. These systems may bear weight, if for example, the skeleton is unable to sustain the load. The system may be used to counteract loads such as for deformities in alignment. Since these systems are implanted into the body, it is critical that they are designed to accomplish the intended tasks with low profiles and minimal geometries; with smooth and minimally invasive tissue contacting surfaces; and with an ease of assembly that facilitates surgical implantation.

A spinal implant system typically consists of one or two stabilizers, such as a rod, plate, or occasionally, a cable. These are held in place relative to the bone by a fastener, which is usually a screw or a hook. In particular for rods, the fasteners usually hold an anchor member with a channel or bore for the rod. In the case of a channel, means are provided to close the rod in the channel, such as a threaded lock which screws onto, or into threads on the anchor, typically exterior to the rod relative to the bone. These means can also include a closure member which is slid, or moved longitudinally into place on the anchor recess. Such a closure member may include mating surfaces such as flanges in the form of dovetails or cut back recesses that assure that the closure member will have a limited degree of freedom relative to the anchor member during surgical assembly. Of course, other locking or closure means which may be used are also contemplated with respect to the screw of the present invention.

It is often critical to the proper functioning of these systems that the stabilizer can be secured in position in the anchor. This often means restraining the stabilizer from slipping longitudinally. This may be particularly difficult when the system is used to manipulate the skeletal system, such as for a curvature of the spine. Often, very small fastening means such as screws or nuts are used in the anchor to retain the stabilizer in place. These screws, which may be referred to as set screws or fastening screws, are received in threaded recesses in the anchor, or closure member, and tightened onto the stabilizer to hold it in place. Alternatively, an anchor member may include a nut which closes a rod recess and secures the rod in place. Collectively, these fastening means as well as other possible clamping elements are referred to herein as fasteners.

With the surgical environment, it is critical that the implant system function reliably, and goes together easily in spite of the very small size. As for any surgery, time is of the essence for surgical implantation. For spinal surgery, many components may have to be assembled so that a time savings for each anchor assembly is multiplied by anywhere from two to up to twenty when a pair of rods is used to span multiple vertebrae. Moreover, the assemblies are designed to avoid mechanical complications, such as cross-threading, stripped threads, unintentional shearing of parts, splintering, fussy assembly, and components or metallic parts which are hard to handle and could drop into or contaminate the surgical site.

Since the fasteners of the prior art assemblies have often been required to generate a relatively large amount of torque, i.e. from 50 to 100 or more inch-pounds, they are typically designed with internal hexagon torque recesses. However, a problem with these fasteners is that the hex can be stripped so that the screws cannot be tightened, or backed out without a special tool. The prior art has recognized that this problem exists, and special shapes including for example, the sinusoidal torx recess, have been devised in order to achieve high torque for small internal recesses. However, the problem with this shape is that the recess strips out fairly easily or tip of the driving tool can be sheared off. While for many applications, this would be inconvenient. It is especially important for an implant assembly where the tip could fall into the surgical site and where the assembly and disassembly must be smooth.

Of course, this screw and torque driving tool has other applications which can utilize the advantages of this invention.

SUMMARY AND OBJECTS OF THE INVENTION

The present invention provides a fastener, specifically including a screw or nut, having a unique torque recess which is a central cylindrical recess having equi-spaced cylindrical grooves set about the circumference of the central recess. In cross-section, this shape appears to be a circle having 2 to 6 equally spaced lobes, which are preferably also circular. The lobes do not overlap each other. They do overlap the circumference of the central circle. Consequently, there are areas between each of the hemicircular lobes which are an arc of the central circle. Alternatively, these joining sections can also be flat. It is however preferable that the lobes form a sharp distinction, or crease, where they join the central recess, and that they have a curve shaped away from the central recess which is preferably circular, but could also be oval, or some complex shape. The recess has a constant shape along its longitudinal length, i.e. its depth.

There is a top concave opening to the recess which forms the transition between a planar top surface and the recess. The screw has an outer circumference which preferably include flats on the edge in order to better enable it to be started by finger tightening, if desired. The outer circumference has from about 4 to about 8, and preferably 6 flats separated by small rounded joints. Further, the area between the side and the flat top is chamfered to avoid sharp edges.

The tip of the tool has a mating correspondence to the recess. There is a cylindrical central core which is bounded by a equally spaced series of cylinders which intersect the circumference of the central core, such as at the center of the lobes. Accordingly, the areas of the tip which separate the outer cylinders appear as grooves or creases in the external surface of the tip. The bottom of the each groove is convex as it is defined by the arc of the central core, although it is contemplated that this area can also be flat. As has been mentioned for the recess, a sharp delineation forms where each of the outer cylinders join the central core. The tip has a transition area where the diameter decreases from a larger cylindrical shape to an area of triangular lands separated by the curving grooves. A triangular land joins and intersects an outer cylindrical groove. The depth of the constant cross-section area is substantially the same as the depth of the recess. The bottom is flat, but could have other configurations. There are from 2 to 6 peripheral cylinder portions (i.e. lobes), but more preferably, there are 4 or 5 with five being most preferred. In a second embodiment, the recess includes interior threads with a minor diameter that corresponds to that of the central core, and a major diameter roughly corresponding to the diameter of a circle which is the lobe to lobe measurement for lobes which are opposing on the core. This results in a series of flights of flanges in the recess that will accept an internal screw.

Thus it is an object of the present invention to provide a screw having a torque driving recess that will allow generation a torque of about 100 to about 150 in-lb. In some cases the goal will be a torque of about 20–50 in-lb. It is an object to provide a screw and corresponding tool for an orthopedic implant system which reduces the risk of internal stripping of the torque driving recess and balances it with a reduction of the risk of shearing the tip of the torque driving tool.

DETAILED DESCRIPTION OF THE DRAWINGS

Figure 1:
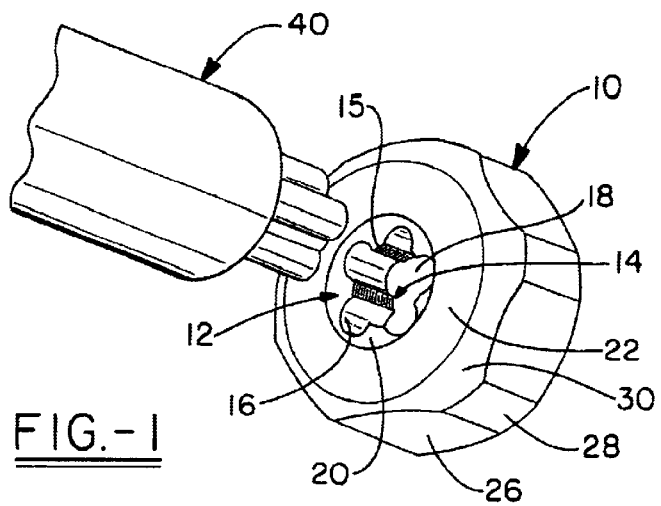
FIG. 1 is a side view of the tool and the top of the screw in accordance with the invention.
Figures 2, 3:
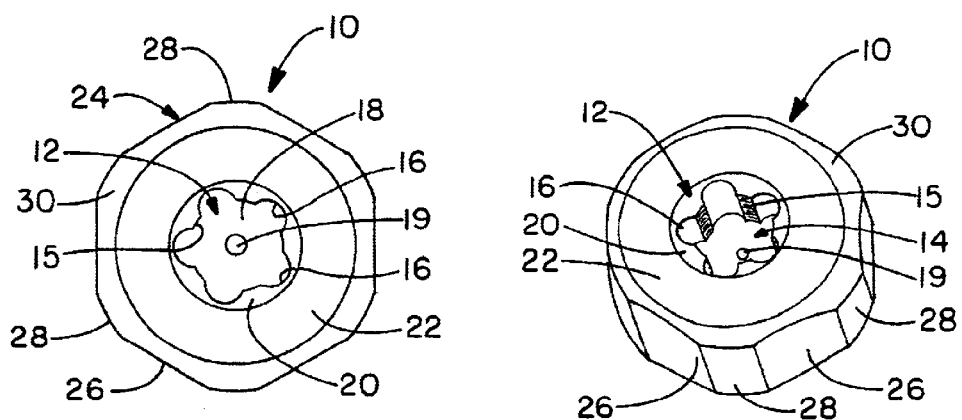
FIG. 2 is a top view of the screw.
FIG. 3 is a top view of the edge of the head of the screw.
Figure 4:
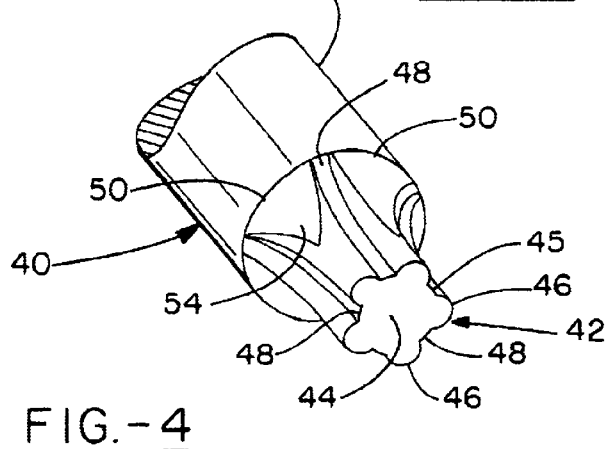
FIG. 4 is a bottom edge view of the tip of the tool.
Figure 5:
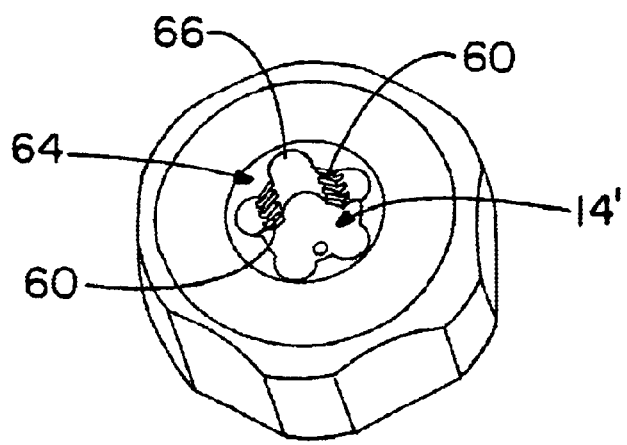
FIG. 5 is a top view of a second embodiment of the screw.
Figure 6:
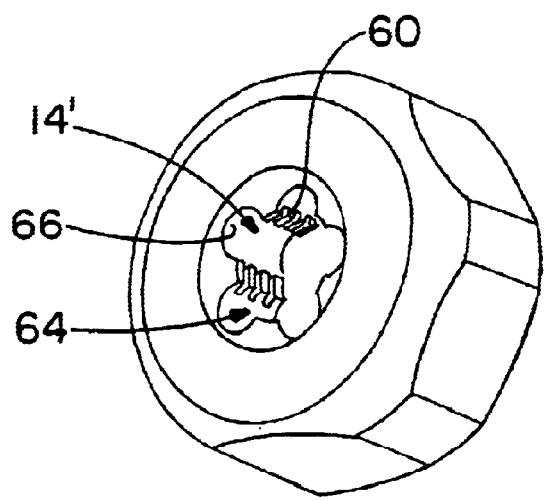
FIG. 6 is a bottom view of the embodiment of FIG. 5.

The present invention provides a fastener and tool. In particular, these are designed for use with an orthopedic implant for human or other animal use. Typically, such implants have an elongated stabilizer which can comprise a plate, a rod, or even a cable. The stabilizer is secured to a bone by means of a bone fastener which is customarily a screw (and which can comprise the present screw), or a hook, or other means of fastening. The fastener can also be used with a cross connector between rods or plates. In the case of a rod, the bone fastener includes an anchor which secures the rod relative to the bone fastener. The anchor can be integral to the bone fastener, or can be a separate component which is assembled with the bone fastener. The anchor includes a bore or a channel which receives the rod. If the channel is open along the top, the anchor includes closure means for the channel, which can include a threaded nut or screw which mates with threads that are respectively on an exterior surface of the anchor, or on the inside of a recess. An additional location where the screw of the present invention can be used is for transverse connectors which link a pair of spinal rods on either side of the spinous process together. These connectors typically have one or two rod anchors which are fastened to the stabilizer rods by means of a locking assembly. These anchors are connected by a central link. These assemblies are meant to illustrate, and not to limit the orthopedic systems in which the present invention can be used. The fastener is made from a suitable material for implantation, such as surgical grade steel or titanium.

In particular, the present invention relates to a fastener including a nut or screw for an orthopedic implant 10 having a head with a unique torque recess 12 which comprises a central cylindrical recess 14 having equispaced non-overlapping cylindrical grooves 16 set about the circumference of the central recess. In cross-section, this shape appears to be a circle having 2 to 6 equally spaced lobes, which are preferably curved and more preferably also circular. The lobes do not overlap, but form a sharp distinction or internally projecting land 15 where they intersect the central recess. These areas retain the shape of the central recess, and can be arcs of a circle, or can be flat. The lobes do not overlap. This would form a scalloped shape having a V-shaped transition between lobes. The recess has an area in which the cross-section is constant along the long axis (i.e. the depth) of the recess. This area may terminate in a flat bottom 18 with a central divot 19. There is a top concave opening 20 to the recess 14 which forms the transition between a planar top surface 22 and the recess.

The head of the fastener has an outer circumference 24 which preferably include flats 26 in order to better enable it to be started by finger tightening, if desired. The outer circumference 24 has from about 4 to about 8, and preferably 6 flats 26 separated by small rounded joints 28. Further, the area or edge 30 between the side 24 and the flat top 22 is chamfered to avoid sharp edges.

The tip 42 of the tool 40 has a mating configuration which corresponds to the configuration of the recess 14. There is a cylindrical central core 44 which is bounded by a equally spaced non-overlapping series of cylinders 46 which intersect the circumference 45 of the central core 44. Accordingly, the areas of the tip which separate the outer cylinders appear as grooves 48 in the external surface of the tip. The bottom of the grooves is convex as it is defined by the arc of the central core. A sharp delineation forms where each of the outer cylinders join the central core. The tip has a transition area 50 where the diameter decreases from a larger cylindrical shape 52 to an area of triangular lands 54 separated by the arching grooves 48. A triangular land 54 joins and intersects an outer cylindrical groove. The depth of the constant cross-section area is substantially the same as the depth of the corresponding area of the recess. The bottom surface 56 is flat. There are from 2 to 6 peripheral cylinder portions 46 (i.e. lobes), but more preferably, there are 4 or 5 with five being most preferred.

In a second embodiment, recess 14' has the previously defined configuration with a central core 44' bounded by the equally spaced lobes or cylinders 46' however, the recess further includes internal threads 60 which appear as a series of flanges, and will receive the external threads of a mating component, such as a screw.

While in accordance with the patent statutes the best mode and preferred embodiment have been set forth, the scope of the invention is not limited thereto, but rather by the scope of the attached claims.

What is claimed is:

1. A fastener system comprising:
   a fastener with a torque driving recess comprising a central recess defining a peripheral surface having from 2 to 5 curved grooves spaced on it equally and so that the grooves do not intersect each other, but intersect the peripheral surface to define for each groove, an arc of the peripheral surface, and wherein adjacent pairs of grooves form an internally projecting land, each land defining a first distance on the peripheral surface between each adjacent pair of grooves each said are defining a second distance which is between one land and the next respective land, the first distance being less than the second distance, and where the driving recess has a longitudinal axis along its depth and where the driving recess is substantially constant in cross section along at least a portion of its length; and a torque driving tool having a torque driving tip having a cylindrical central core bounded by an equally spaced series of rounded longitudinally extending lobes which intersect the circumference of the central core whereby the tip has a configuration which mates with the configuration of the torque driving recess.

2. A fastener system as set forth in claim 1 wherein the control recess has a circular cross-section shape.

3. A fastener system as set forth in claim 2 wherein each of the grooves has the same shape.

4. A fastener system as set forth in claim 3 wherein the cross-sectional shape of each groove is a portion of a circle.

5. A fastener system as set forth in claim 4 wherein the portion is about one half of a circle.

6. A fastener system as set forth in claim 5 wherein there are 4 or 5 grooves.

7. An orthopedic tool and implant comprising:

on orthopedic implant having a fastener with a torque driving recess comprising a central receiving defining a peripheral surface having from 2 to 5 curved grooves spaced an it equally so that each of the grooves interact the peripheral surface to define an arc or the peripheral surface, and adjacent pairs of grooves define a land on the peripheral surface, wherein all of the lands collectively define a first distance on the peripheral surface, and all of the arcs collectively define a second distance on the peripheral surface, the first distance being less than the second distance, and where the driving recess has a longitudinal axis along its depth and the driving recess it substantially constant in cross section along at least a portion of its length; and a tool having a torque driving tip having a cylindrical central core bounded by an equally spaced series of rounded longitudinally extending lobes which intersect the circumference of the central core whereby the tip has a configuration which mates with the configuration of the torque driving recess.

8. An orthopedic tool and Implant as set forth in claim 7 wherein the central recess has a circular cross-section shape.

9. An orthopedic tool art implant as set forth in claim 8 wherein each of the grooves have the same shape.

10. An orthopedic tool and implant as set forth in claim 9 wherein the cross-sectional shape of each groove is a portion of a circle.

11. An orthopedic tool and implant as set forth in claim 10 wherein the portion is about one half of a circle.

12. An orthopedic tool and implant as set forth in claim 11, wherein there are 4 or 5 grooves.

13. An orthopedic tool and Implant as set forth in claim 12 wherein the torque driving recess further includes internal threads.

\* \* \* \* \*